(12) United States Patent
Sasaguri et al.

(10) Patent No.: US 8,188,668 B2
(45) Date of Patent: May 29, 2012

(54) IMAGE DISPLAY APPARATUS AND METHOD OF DRIVING THE SAME

(75) Inventors: Daisuke Sasaguri, Yokohama (JP); Yuji Kasanuki, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1206 days.

(21) Appl. No.: 11/738,080

(22) Filed: Apr. 20, 2007

(65) Prior Publication Data

US 2007/0267962 A1   Nov. 22, 2007

(30) Foreign Application Priority Data

May 19, 2006   (JP) ................................. 2006-140880
Apr. 10, 2007   (JP) ................................. 2007-102687

(51) Int. Cl.
*G06G 3/10* (2006.01)

(52) U.S. Cl. .................. 315/169.3; 315/169.1; 313/495; 313/496; 345/75.1

(58) Field of Classification Search .......... 313/483–487, 313/495–497, 503, 512; 345/75.1, 75.2, 345/202; 315/169.3, 169.1; 252/301.4 S, 252/301.4 P, 301.6 R, 301.6 S, 30.6 P
See application file for complete search history.

(56) References Cited

U.S. PATENT DOCUMENTS

| | | | | |
|---|---|---|---|---|
| 3,639,254 A | | 2/1972 | Peters .......................... | 252/301.4 |
| 5,966,787 A | | 10/1999 | Nakayama et al. .......... | 29/25.35 |
| 6,140,985 A | * | 10/2000 | Kanai et al. .................. | 345/74.1 |
| 6,153,123 A | * | 11/2000 | Hampden-Smith et al. ........................ | 252/301.4 S |
| 6,504,297 B1 | * | 1/2003 | Heo et al. ...................... | 313/467 |
| 6,653,777 B1 | * | 11/2003 | Onishi .......................... | 313/495 |
| 6,753,099 B2 | | 6/2004 | Imamura et al. | |
| 6,791,253 B2 | | 9/2004 | Komatsu et al. .............. | 313/486 |
| 6,975,288 B2 | | 12/2005 | Nishimura et al. .......... | 345/74.1 |
| 7,138,965 B2 | * | 11/2006 | Shiiki et al. .................. | 315/169.4 |
| 7,522,131 B2 | * | 4/2009 | Kang ............................ | 345/74.1 |
| 7,554,256 B2 | * | 6/2009 | Onishi .......................... | 313/496 |
| 7,638,934 B2 | * | 12/2009 | Fukuda et al. ................ | 313/485 |

(Continued)

FOREIGN PATENT DOCUMENTS

CN  1363944 A  8/2002

(Continued)

OTHER PUBLICATIONS

XP-002485925: Yen W.M. et al, "Inorganic Phosphors: Compositions, Preparation and Optical Properties", 2004, CRC Press, pp. 65-66 and 318-321.

(Continued)

*Primary Examiner* — Jacob Y Choi
*Assistant Examiner* — Ephrem Alemu
(74) *Attorney, Agent, or Firm* — Fitzpatrick, Cella, Harper & Scinto

(57) ABSTRACT

An image display apparatus includes a rear plate provided with a plurality of electron-emitting devices, each electron-emitting device emitting electron; a face plate disposed opposite the plurality of electron-emitting devices and provided with a plurality of pixels of phosphor, each pixel of phosphor being irradiated with electrons emitted from corresponding ones of the electron-emitting devices to generate light; and a driver for scanning the plurality of electron-emitting devices for emitting electron from the plurality of electron-emitting devices. The phosphor has luminescence center of allowed transition type material, and the driver scans the plurality of electron-emitting devices so that maximum of charge density dosed in one pixel phosphor, during one scanning period, is equal to or larger than $3 \times 10^{-8}$ C/cm$^2$.

6 Claims, 5 Drawing Sheets

U.S. PATENT DOCUMENTS

| | | | |
|---|---|---|---|
| 2002/0021083 A1* | 2/2002 | Hasegawa et al. | 313/495 |
| 2002/0036599 A1 | 3/2002 | Nishimura et al. | 345/11 |
| 2002/0093469 A1* | 7/2002 | Suzuki et al. | 345/60 |
| 2003/0071560 A1 | 4/2003 | Komatsu et al. | 313/467 |
| 2003/0094889 A1 | 5/2003 | Imamura et al. | |
| 2004/0070331 A1* | 4/2004 | Kuno et al. | 313/495 |

FOREIGN PATENT DOCUMENTS

| | | |
|---|---|---|
| EP | 1 032 020 A2 | 8/2000 |
| EP | 1 719 810 A1 | 11/2006 |
| JP | 53-91658 | 8/1978 |
| JP | 5-25102 | 2/1993 |
| JP | 05251023 A2 | 9/1993 |
| JP | 7-122364 | 5/1995 |
| JP | 2000-250473 | 9/2000 |
| JP | 2000-319649 | 11/2000 |
| JP | 2003-197135 | 7/2003 |
| WO | 2005080528 A1 | 9/2005 |

OTHER PUBLICATIONS

Chinese Official Letter of Communication dated Oct. 17, 2008.

* cited by examiner

IMAGE DISPLAY APPARATUS AND METHOD OF DRIVING THE SAME

BACKGROUND OF THE INVENTION

1. Field of the Invention

The present invention relates to an image display apparatus having phosphors.

2. Description of the Related Art

Hitherto, an image display apparatus, which is an electron beam excitable display in which electron beams excite phosphors to emit light typified by a cathode ray tube (CRT) called "Braun tube," has used phosphors such as ZnS:Cu, Al, ZnS:Ag, Cl, $Y_2O_2S$:Eu referred to as "P22."

On the other hand, image display apparatuses in which electron beams excite phosphors to emit light include a field emission display (FED) as well as a conventional CRT. The FED includes a field-emission electron-beam excitable display referred to as "Spindt-type display" and a display using surface-conduction electron-emitters, referred to as "surface-conduction electron-emitter display (SED)".

Most FEDs in which electron beams are accelerated by a comparatively high voltage to cause phosphors to emit light apply phosphors used in a conventional CRT or use their improvements.

Japanese Patent Application Laid-Open No. H05-25102 describes an example where a conventional zinc sulfide-based phosphor is used as a phosphor for the FED.

In addition, Japanese Patent Application Laid-Open No. 2000-250473 describes an example where the surface-conduction electron-emitter is used as an electron-emitting device and a phosphor used in the CRT is used.

Japanese Patent Application Laid-Open No. 53-91658 describes an example where $SrGa_2S_4$:Eu is used as a green phosphor for the CRT. In Japanese Patent Application Laid-Open No. 2000-319649, a phosphor containing a mixture of $Y_2SiO_5$:Tb and $SrGa_2S_4$:Eu is used as a phosphor for the CRT.

Japanese Patent Application Laid-Open No. 2003-197135 describes an example where $CaMgSi_2O_6$:Eu is used as a blue phosphor for the FED.

SUMMARY OF THE INVENTION

In a CRT illustrated in FIG. 4, electron beams 1202 emitted from one or three electron guns 1203 scan a whole screen 1201 coated with phosphors to cause phosphors forming pixels to emit light. In a color CRT, the red, green and blue phosphors P22 are cyclically formed. The density of electric charges per pixel in electron beams emitted from the electron gun is small. However, high accelerating voltage of electrons has provided a sufficient luminance.

In general, the FED is lower in the accelerating voltage of electrons than the CRT, so that the FED needs to use a larger amount of current (to be exact, an electric charge density per pixel provided during one scanning period) to cause phosphors to emit light in order for the FED to deliver the luminance equivalent to that by the CRT.

Electron beam excitable displays using the phosphors P22 were investigated in detail. As a result, it was found that an increase in an electric charge density provided significantly decreases a light emission efficiency not to realize an image display apparatus with a sufficiently high luminance.

The present invention has its purpose to provide an image display apparatus with a high luminance, longer lifetime and wide color reproducible range using a phosphor material best suited for driving conditions for the image display apparatus such as an FED.

In order to solve the problem of the conventional background art and to achieve the purpose of the present invention, the present invention provides an image display apparatus comprising:

a rear plate provided with a plurality of electron-emitting devices, each of electron-emitting devices emitting electron; a face plate disposed opposite the plurality of electron-emitting devices and provided with a plurality of pixels of phosphor, each pixel of phosphor being irradiated with electrons emitted from corresponding one of the electron-emitting devices to generate a light; a driver for scanning the plurality of electron-emitting devices for emitting electron from the plurality of electron-emitting devices, wherein the phosphor has luminescence center of allowed transition type material, and the driver scans the plurality of electron-emitting device so that maximum of charge density dosed in one pixel phosphor, during one scanning period, is equal to or lager than $3 \times 10^{-8}$ $C/cm^2$.

According to an another aspect of the present invention, the present invention provides a method of driving image display apparatus which comprises a rear plate provided with a plurality of electron-emitting devices, each electron-emitting devices emitting electron, and a face plate disposed opposite the plurality of electron-emitting devices and provided with a plurality of pixels of phosphor, each pixel of phosphor being irradiated with electron emitted from corresponding one of the electron-emitting devices to generate a light wherein the phosphor has luminescence center of allowed transition type material, the method comprising step of: scanning the plurality of electron-emitting devices for emitting electron from the plurality of electron-emitting devices, wherein in the scanning, maximum of charge density dosed in one pixel phosphor, during one scanning period, is equal to or lager than $3 \times 10^{-8}$ $C/cm^2$.

Further features of the present invention will become apparent from the following description of exemplary embodiments with reference to the attached drawings.

DESCRIPTION OF THE EMBODIMENTS

The embodiments of the present invention are described in detail hereinunder.

Figure 1:
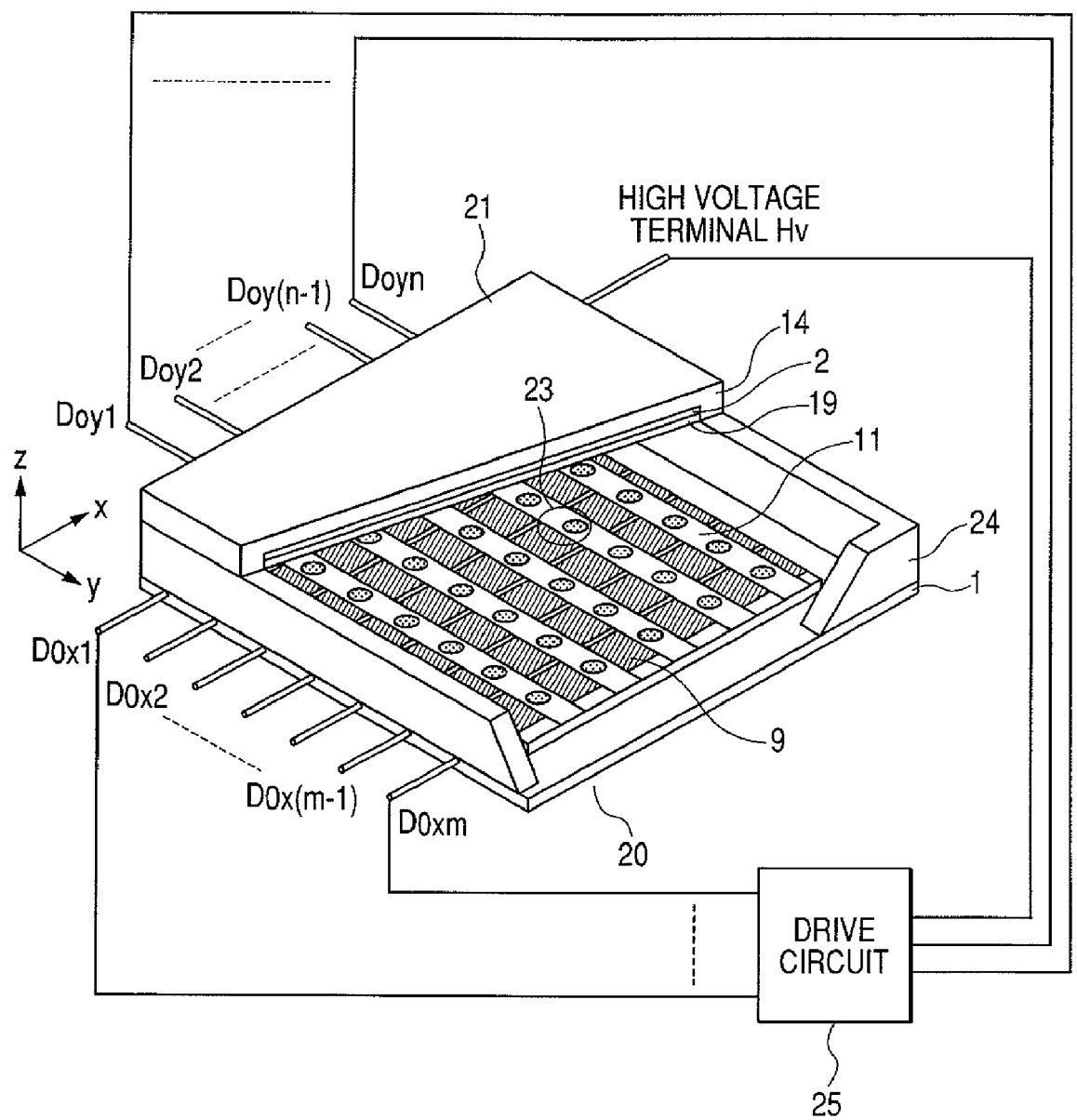
FIG. 1 is an example of the image display apparatus according to the present invention.

The typical configuration of an image display apparatus according to the present invention is described with reference to FIG. 1. FIG. 1 is a schematic diagram of the image display apparatus. The image display apparatus in FIG. 1 includes a rear side substrate 1, a phosphor layer 2 on which phosphors are arranged, an x-direction wiring 9, a y-direction wiring 11, a face side substrate 14, a metallic film 19, a rear plate 20, a face plate 21, an electron-emitting device 23, a side wall 24, and a driving circuit 25. An image display apparatus 1 as shown in FIG. 1 is provided with FED panel and the driving circuit 25. The FED panel is provided with the rear plate 20, the face plate 21 disposed in opposition to the rear plate 20 and a side wall 24. The image display apparatus in FIG. 1 shows a structure in which the rear plate 20 provided with the phosphor layer 2 and the metallic film 19 is partly broken away for the sake of convenience of description. An x-direction is taken to be the direction in which the x-direction wiring 9 extends, a y-direction is taken to be the direction in which the y-direction wiring 11 extends and a z-direction is taken to be the direction in which the rear plate 20 opposes the face plate 21. The electron-emitting device 23 may use a surface conduction electron emitter (SCE), a Spindt-type field emission device, an MIM electron emitting device and a device with a carbon nanotube (CNT) as an emitting portion. In particular, the surface conduction electron-emitter easily produced as an electron-emitting device which enables emitting an electric charge density of $3 \times 10^{-8}$ C/cm$^2$ or more per pixel can be used in the image display apparatus of the present invention.

Figure 3A:
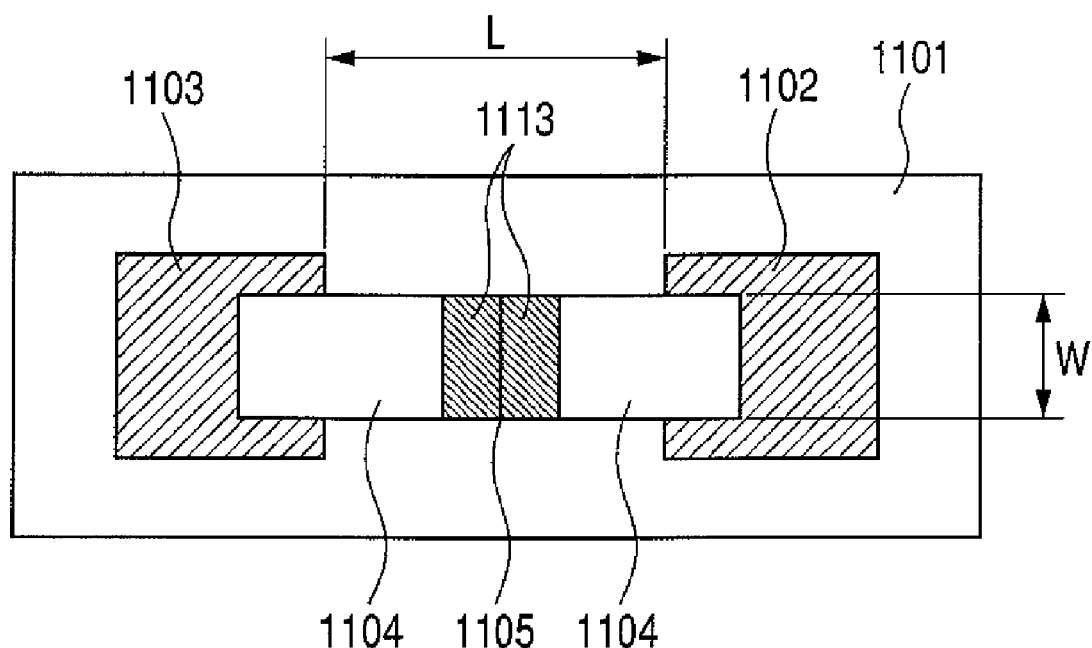
FIGS. 3A and 3B are examples of an electron-emitting device applicable to the present invention.
Figure 3B:
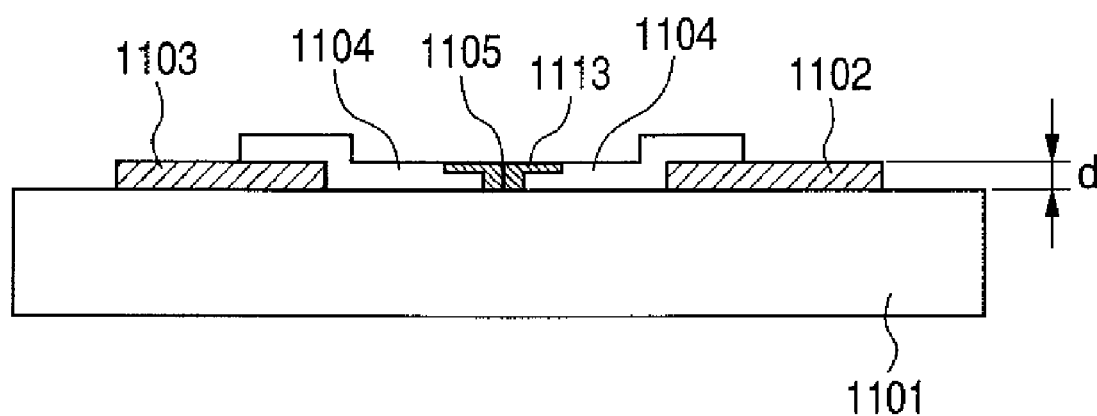
Figure 4:
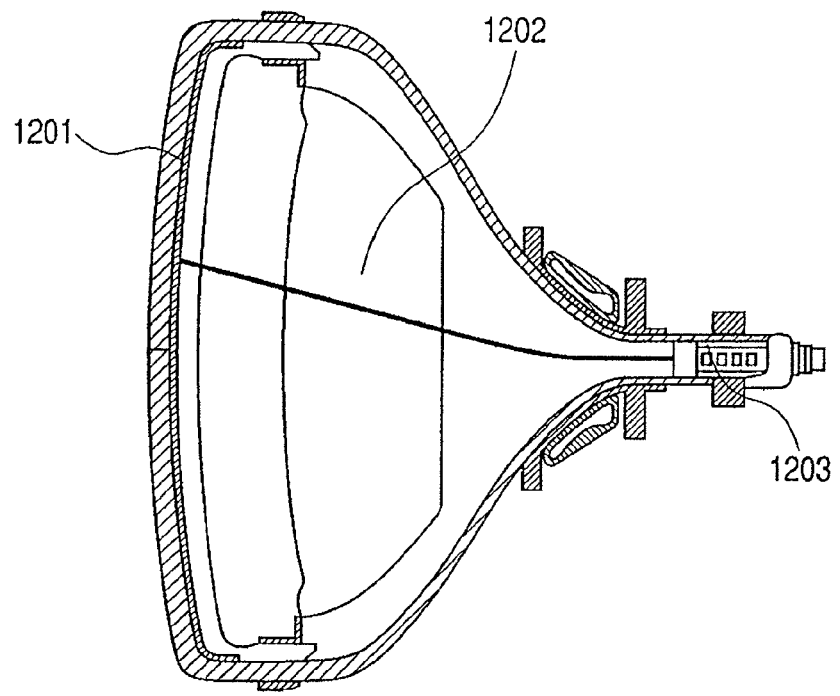
FIG. 4 is a conventional CRT.

FIGS. 3A and 3B schematically illustrate typical configuration of the surface conduction electron-emitter. FIGS. 3A and 3B illustrate a top view of the surface conduction electron-emitter and its cross section respectively.

Device electrodes 1102 and 1103 are formed on a glass substrate 1101 and conductive thin films 1104 are formed between the device electrodes 1102 and 1103. An electron emitting portion 1105 is formed between the conductive thin films 1104. Furthermore, a thin film 1113 is formed around the electron emitting portion 1105.

The device electrodes 1102 and 1103 oppose each other on the substrate 1101 in parallel with the surface thereof. For example, the device electrodes 1102 and 1103 are connected to the x- and the y-direction wiring 9 and 11 respectively. The respective wirings supply the device electrodes 1102 and 1103 with electric potential to cause the electron emitting portion 1105 to emit electrons.

In FIG. 1, the application of a voltage to the x- and the y-direction wiring 9 and 11 generates a high electric field across the electron-emitting device 23 formed at the intersection of the wirings subjected to the voltage and the metallic film 19 subjected to a high voltage, thereby the electron-emitting device 23 emits electrons. The electrons emitted from the electron-emitting device 23 collide with the metallic film 19 to cause phosphors formed between the metallic film 19 and the face side substrate 14 to emit light through the face side substrate 14.

Figure 2A:
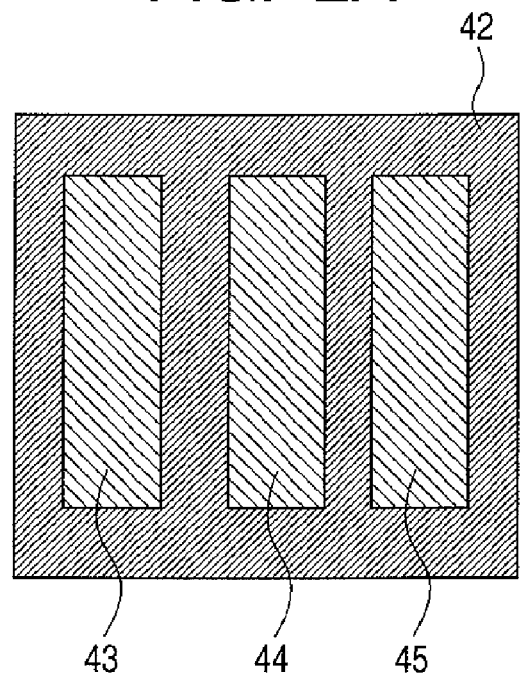
FIGS. 2A and 2B are examples of a phosphor layer according to the present invention.
Figure 2B:
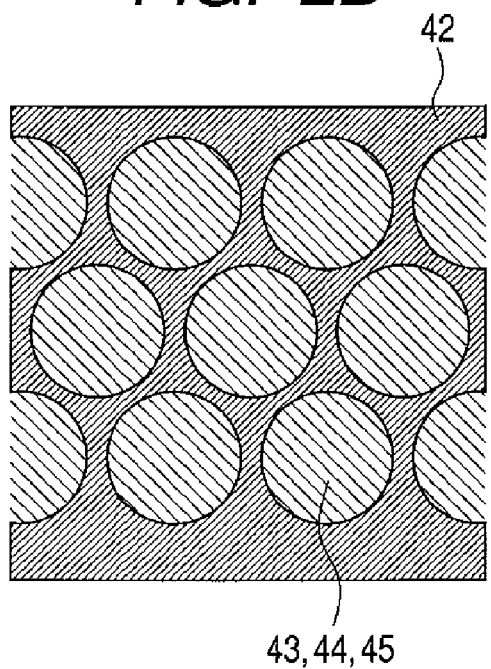

FIGS. 2A and 2B are examples of top view of the phosphor layer 2 viewed from the rear plate 20. The phosphor layer 2 in FIGS. 2A and 2B includes phosphors 43, 44 and 45 and a conductor 42. The phosphors 43, 44 and 45 typically include phosphor materials which emit red, green and blue light respectively. The conductor 42 is desirably provided to prevent charging up due to electron beams. The conductor 42 can use a black material. The reason is that electron beams are prevented from irradiating into adjacent phosphors due to a slight displacement in position irradiated with electron beams and an external light is prevented from reflecting to avoid decrease in display contrast. A black material may be typically based on graphite or other materials.

The phosphors 43, 44 and 45 are separately coated in stripes as illustrated in FIG. 2A and the conductor 42 may be arranged between the stripes. The phosphors 43, 44 and 45 and the conductor 42 are formed by screen printing.

The method of separately coating the phosphors 43, 44 and 45 is not limited to that of arranging them in stripes. For example, a delta arranging as illustrated in FIG. 2B or other arranging may be used.

The parts where monochrome phosphors 43, 44 or 45 are arranged are referred to as pixels. A minimum combination of a plurality of different color pixels in which the colors enabled to be represented by the image display apparatus can be expressed by combining colors of light emitted from pixels is referred to as a set of pixels. Typically, a pixel is a part of emitting monochrome light in any of green, blue or red. A set of pixels is a part of a combination of green, blue and red pixels. The area of one pixel is determined by the number of pixels and the size of an image display apparatus. The same color phosphor may be arranged on adjacent pixels. For example, the same color phosphors are arranged on the all the pixels to enable forming an image display apparatus displaying a monochrome image.

The image display apparatus according to the present embodiment includes the rear plate 20 having an electron source formed of a plurality of electron-emitting devices 23 and the face plate 21 having a plurality of pixels on which monochrome phosphors irradiated with electrons emitted from the electron source. The plurality of electron-emitting devices 23 is arranged not in a particularly restricted manner, so that it may be arranged in a matrix. The plurality of the pixels may be arranged corresponding to the plurality of electron-emitting devices 23 or in a matrix.

If the image display apparatus is used as a full color display, a phosphor surface on which red, green and blue phosphor materials, for example, are arranged is formed on the face plate 21 to control the quantity of electric charges provided according to input signal to produce an image.

The image display apparatus is provided with the driving circuit 25 for setting the accelerating voltage of electrons between 7 kV to 15 kV to obtain sufficient luminance and resolution and setting the maximum electric charge density provided for phosphors to be $3 \times 10^{-8}$ C/cm$^2$ or more during one scanning period.

The driving circuit 25 scans a plurality of electron-emitting devices to cause them to emit electrons. It is noted that the driving circuit 25 is provided with a plurality of circuits such as an anode voltage supplying circuit for supplying an acceleration voltage (anode voltage) to a high voltage terminal, a signal circuit for supplying a signal voltage to X-direction wiring 9 and a scanning circuit for supplying a scanning voltage to y-direction wiring 11. The image display apparatus according to the present invention adjusts a luminance typically by changing an electric charge supplied to the pixels. And, as a method for driving a plurality of electron-emitting devices, a pulse-width modulation method wherein a pulse width of a voltage pulse to be supplied to the electron-emitting devices is controlled, a pulse-amplitude modulation method wherein a pulse-amplitude of the voltage pulse to be supplied to the electron-emitting devices is controlled or a method using both of the pulse-width modulation method and the pulse-amplitude modulation may be used to control the electric charge quantity to be supplied to the pixels.

Incidentally, the phrase "during one scanning period" refers to sequentially inputting complete scanning signals to the wirings to which scanning signals are input at the time of scanning in an electron source with a plurality of electron-emitting devices.

In another aspect, according to the present invention, the charge density dosed in one pixel phosphor by irradiation with the electrons emitted from the energized electron-emitting device during one scanning period is equal to or larger than $3\times10^{-8}$ C/cm$^2$ for a given range of luminance in the image display apparatus.

The metallic film 19 generally referred to as "metal back" is formed over the phosphor layer 2 of the face plate 21 to suppress the charge of phosphors. If an accelerating energy is low, the energy is lost in the metallic film 19 to provide an insufficient luminance.

In the image display apparatus such as an FED, a voltage is applied across a several-mm deep narrow space. Therefore, excessively high voltage causes a problem with discharge.

For this reason, the accelerating voltage of electrons can be selected in the range of 7 kV to 15 kV.

The phosphors 43, 44 and 45 use a doped phosphor to which an allowed-transition luminescence center is added. Materials used in the allowed transition luminescence center are, for example, monovalent Tl, divalent Sn, Eu, Pb, Sm or Yb, and trivalent Sb, Bi or Ce. The allowed transition materials are desirably rare earth metal. The phosphors using divalent Eu or trivalent Ce as the luminescence center are particularly desirable in terms of a luminance characteristic.

ZnS:Cu, Al and ZnS:Ag,Cl are known as conventional typical phosphor materials for electron beams. These phosphor materials use a donor-acceptor transition and take from several tens of μsec to 100 μsec until excited energy is converted into light.

On the other hand, it has been known that a transition time is as short as several hundred nsec to several μsec in the doped phosphor material to which the allowed-transition luminescence center is added.

A high-efficient image display apparatus has been realized with the conventional phosphor materials ZnS:Cu,Al or ZnS:AG,Cl which exhibit satisfactory light emission characteristics under the driving conditions of the CRT, although the transition time of the materials is a little longer because the density of electric charges provided is low in the conventional CRT.

In the image display apparatus typified by the FED in which high-density electric charge is provided, however, a light emission efficiency is significantly decreased in the area of the high-density electric charge, so that a further improvement has been demanded. In addition, a great burden has been given to phosphors because high-density electric charge is provided to increase luminance.

It has been found that a phosphor material to which the allowed transition material is added as a luminescence center hardly vary in light emission characteristic with variation in electric charge amount provided.

The above reason is not clear but seems to be attributed to the following. A conventional phosphor is slow in conversion rate from energy to light, so that a light converting process lags behind when high-density electric charge is provided, which causes non-light emission radiation. On the other hand, the phosphor material to which the allowed transition material is added as a luminescence center is faster in conversion rate, so that it seems that a constant efficiency can be obtained even in high electric-charge density.

Detailed investigations into this phenomenon have revealed that the use of a light emitting material combining a specific host material with a luminescence center material provides a higher light emission efficiency than the phosphor P22 which has been conventionally widely used as phosphor material for electron beams, in the image display apparatus in which an electric charge density of $3\times10^{-8}$ C/cm$^2$ or more is provided for phosphors.

However, providing excessively high electric charge density heats a phosphor surface to cause fusion, accelerating degradation. The upper limit of electric charge density is desirably $3\times10^{-6}$ C/cm$^2$.

Phosphor materials using divalent Eu as a luminescence center include, for example, $SrGa_2S_4$:Eu (green), $BaGa_2S_4$:Eu (color mixture of blue and green), $CaGa_2S_4$:Eu (color mixture of green and red), $Ba_3Ga_2S_6$:Eu (green), $(Ca,Ba)Ga_2S_4$:Eu (green), $SrY_2S_4$:Eu (red), $CaY_2S_4$:Eu (red), $CaAlSiN_3$:Eu (red), $Sr_2Si_5N_8$:Eu (red), $Ca_2Si_5N_8$:Eu (red), $(Sr,Ca)Si_5N_8$:Eu (red), $CaMgSi_2O_6$:Eu (blue), $Sr_2P_2O_7$:Eu (blue), $(Sr,Ca,Mg)SiO_4$:Eu (blue), and $Sr_3MgSi_2O_8$:Eu (blue).

Phosphor materials using trivalent Ce as a luminescence center include, for example, $Y_2SiO_5$:Ce (blue), $CaGa_2S_4$:Eu (blue), $Ba_2SiS_4$:Ce (blue), YAG:Ce (color mixture of green and red), and $Ca_3Sc_2Si_3O_{12}$:Ce (green).

The above mentioned green, blue and red can be typically represented by CIE (x,y) chromaticity coordinates such as the following:

$$\text{Green}(x,y)=(0.15\leq x\leq 0.35, 0.5\leq y\leq 0.85)$$

$$\text{Blue}(x,y)=(0.05\leq x\leq 0.25, 0\leq y\leq 0.2)$$

$$\text{Red}(x,y)=(0.5\leq x\leq 0.73, 0.2\leq y\leq 0.4)$$

where, each color shows a visible area in the above range.

The phosphor material using one or plural kinds of alkali earth metal as a host material is the most desirable in consideration of a light emission efficiency and durability against electron beams.

A phosphor material $SrGa_2S_4$:Eu which uses thiogallate crystal including alkali earth metal as host material and Eu as luminescence center material, or $(Sr_{1-x}, Ba_x)Ga_2S_4$:Eu, $Ba_3Ga_2S_4$:Eu, and $(Ca, Ba)Ga_2S_4$:Eu is used as a green phosphor material, where x is desirably larger than zero and less than 0.3.

Thiogallate refers to a compound including Ga and S.

Among others, $SrGa_2S_4$:Eu and $(Sr_{1-x}, Ba_x)Ga_2S_4$:Eu in which a part of Sr atoms is substituted with Ba are high in light emission efficiency and in durability against electron beams and capable of providing a better color reproducible range than the conventional ZnS:Cu, Al.

The phosphor material $(Sr_{1-x}, Ba_x)Ga_2S_4$:Eu varies in color from green to blue-green by changing the ratio of Sr to Ba. The composition ratio of Sr to Ba can be determined as required to obtain light emission further closer to green by NTSC than that from $SrGa_2S_4$:Eu.

When the material $(Sr_{1-x}, Ba_x)Ga_2S_4$:Eu is used as a green phosphor material, x is selected in the range of $0<x\leq 0.3$ and more desirably in the range of $0<x\leq 0.25$.

For the phosphor materials according to the present invention, the excessive addition of the luminescence center concentration causes phenomenon referred to as density quenching to lower luminance. Actually a light emission luminance varies with a certain luminescence center concentration as its peak. The optimum luminescence center concentration can be selected in the range within which a sufficient luminance can be obtained.

In the driving conditions according to the present invention, the ratio of the atomic number of Eu to Sr (or, the sum of atomic number of Sr and Ba) desirably falls within $0.001\leq \text{Eu/Sr (or, Eu/(Sr+Ba))}\leq 0.1$ in the phosphor materials $SrGa_2S_4$:Eu and $(Sr, Ba)Ga_2S_4$:Eu as an optimum luminescence center concentration.

An optimum luminescence center concentration can be selected from a range of $0.001 \leq Eu/Sr \leq 0.1$ according to the light emission efficiency of other phosphors to be combined therewith.

The light emission characteristic required for a blue phosphor needs to be evaluated by an index determined by a white color temperature which is a standard for an image display apparatus, the light emission efficiency of phosphors in each color and the balance of color coordinate. Importance is attached to the performances of both of color and light emission efficiency.

A phosphor material with silicate crystal including alkali earth metal as a host material can be used as a blue phosphor in view of the above index. The most desirable materials include $CaMgSi_2O_6:Eu$, $(Sr,Ca,Mg)SiO_4:Eu$, and $Sr_3MgSi_2O_8:Eu$.

In particular, the phosphor expressed by $CaMgSi_2O_6:Eu$ is high in light emission efficiency by electron beams, excellent in durability and wide in color reproducible region.

As is the case with the above, a luminescence center concentration of the above blue electron beam excitable phosphor is desirably $0.01 \leq Eu/Ca \leq 0.07$ within which luminance has a peak at a certain density.

The luminescence center concentration may select the optimum value according to the light emission efficiency of other phosphors to be combined therewith in the range of $0.01 \leq Eu/Ca \leq 0.07$.

The phosphors 43, 44 and 45 are formed in a film shape with phosphor materials ground to a grain uniform in size. Most of phosphor materials are high in resistance. The optimum grain size of phosphors can be selected case by case according to the accelerating voltage of electrons or the configuration of the face plate 21. In other words, although the optimum grain size is different depending on the penetration depth of electron beams provided, an average grain size may be typically 0.5 μm or more to 15 μm or less. In addition, an average grain size can be 1 μm or more to 5 μm or less from the viewpoint of charge.

As described earlier, when a white balance is designed so that light emitting color is caused to be close to a desired color coordinate and color temperature, the luminance required for phosphors of each light emitting color is calculated by color coordinate of red, green and blue phosphors and electric charge density to be provided are designed to obtain luminance required for respective phosphors.

Furthermore, a light emission luminance of each phosphor can be adjusted so that desired white display is enabled when the same electric charge density is provided for phosphors of each light emitting color.

A light emission luminance is adjusted by the luminescence center concentration of phosphors of each color. For example, it has been known that the green phosphor $SrGa_2S_4$:Eu emits the brightest light when a concentration of the luminescence center Eu is from 0.1% to 10%.

Similarly, it has been known that the blue phosphor $CaMgSi_2O_6:Eu$ emits the brightest light when a concentration of the luminescence center EU is from 1% to 7%.

The use of such variations in luminance characteristic with the luminescence center concentration enables the design of the optimum white balance.

For example, when a luminance in green is excessively high, the luminescence center concentration of a blue phosphor is adjusted to the concentration at which the highest luminance can be obtained and the luminescence center concentration of a green phosphor uses an area lower than the concentration of the EU at which the highest luminance can be obtained or an area of the highest concentration, which enables luminance to be adjusted.

When a luminance in blue is excessively high, on the other hand, as is the case with the above method, the luminescence center concentration of a blue phosphor is optimized to suppress luminance, thereby allowing the optimum white display.

In addition to the method of adjusting the luminescence center concentration of phosphors of each color, a light emission luminance may adjusted by coating the surface of phosphor powder of each color with a non-light emission substance or regulating the opening area of the phosphors 43, 44 and 45 in the black conductor 42.

For example, when the green phosphor $SrGa_2S_4$:Eu, the blue phosphor $CaMgSi_2O_6$:Eu and the red phosphor $Y_2O_2S$:Eu are combined and the white balance is set at a color temperature of 9300 Kelvin, luminance in green can be excessively high. In that case, the surface of powder of the phosphor whose luminance needs to be lowered is coated with a non-light emission substance to allow the luminance to be lowered. Although fine particles such as silica or alumina can be used as the non-light emission substance, other oxide, nitride, sulfide or metal fine particle may be used.

Figure 5:
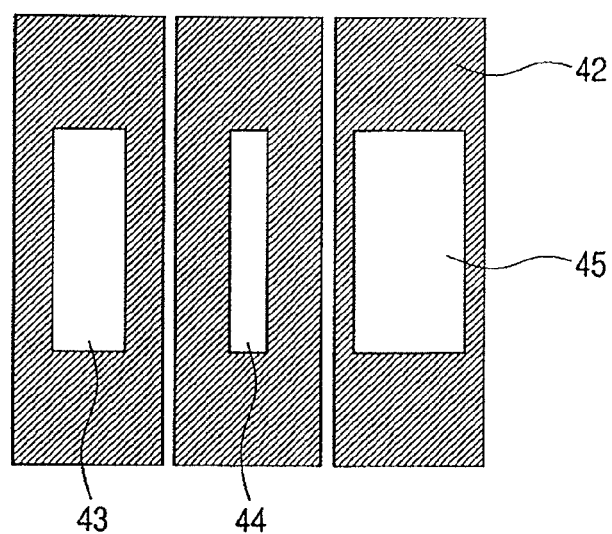
FIG. 5 is another example of a phosphor layer according to the present invention.
Figure 6:
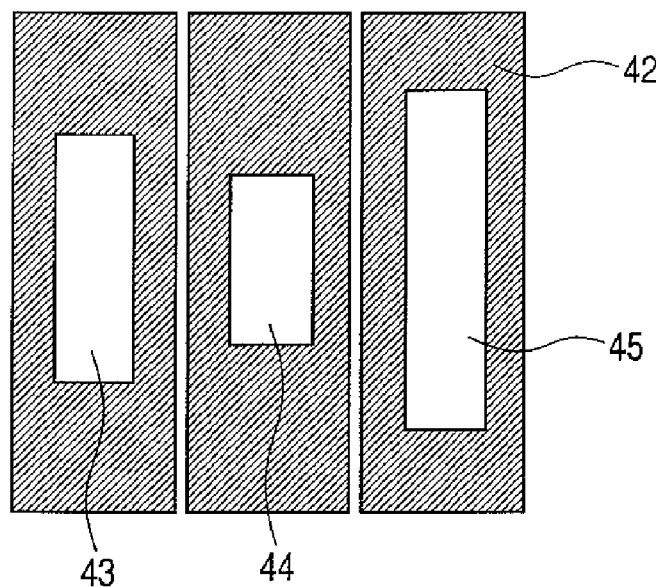
FIG. 6 is still another example of a phosphor layer according to the present invention.

As another method of adjusting the white balance, the opening area of the phosphors 42, 43 and 44 can be varied according to luminance as illustrated in FIG. 5. The method of varying the opening area does not need lowering the characteristic of phosphor, which is desirable in view of suppressing decrease in luminance caused by the adjustment of white balance. As illustrated in FIG. 5, the opening area may be changed in its length not only in the column direction (narrow side direction of the opening area), but in the row direction (long side direction of the opening area), or in both directions as well. The opening shape is not limited to the rectangle in FIG. 5 and an optimum shape may be selected depending on electron beam profile.

Figure 7:
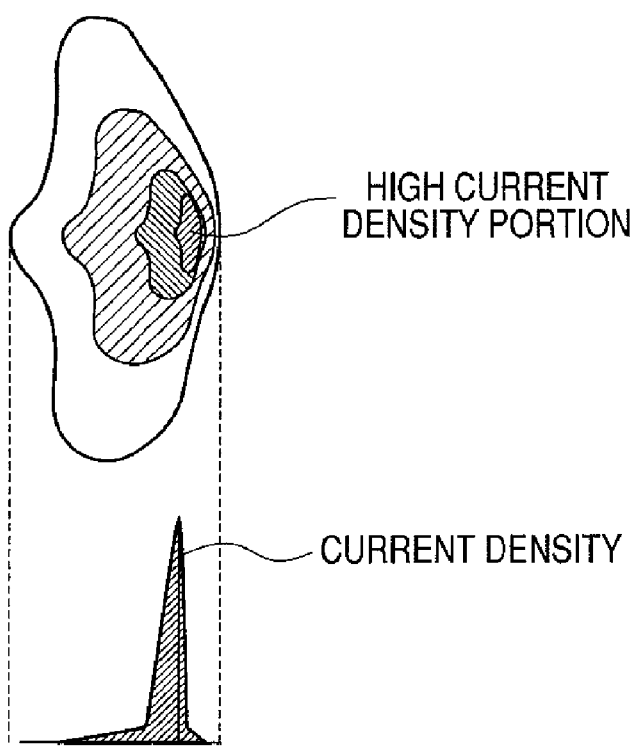
FIG. 7 is a schematic diagram describing the beam profile of electron beams.

For example, the electron beam profile is elongated as illustrated in FIG. 7 in the surface-conduction electron-emitting device having a configuration in FIGS. 3A and 3B. Beam current greatly changes in distribution in the minor-axis direction and gently changes in the major-axis direction. When the area of the opening portion is adjusted in this beam profile, it is easier to adjust the opening length in the major axis direction of the beam profile than in the minor axis direction thereof.

The metallic film 19 provided over the phosphors 43, 44 and 45 and the conductor 42 has a role as an electrode subjected to a high voltage and a function to prevent phosphors from being charged.

Although a metallic conductive material such as Al may be used as a material for the metallic film 19, a getter material absorbing oxygen may be deposited on the metallic conductive material such as Al. The use of a getter material in the metallic film 19 causes a getter material to absorb an inflow gas even if a small amount of outside air flows into a sealed space between the face plate 21 and rear plate 20. This maintains a hermetic state for a long time. The getter material is made of alloy including Ti, Zr, Ba or at least one of those elements as a major ingredient and may include any one or more elements of Al, V and Fe as a minor ingredient. The optimum thicknesses of the metallic film 19 and the getter material can be selected according to the accelerating voltage of electrons. The metallic film 19 can be replaced with a conductive getter material instead of a metallic conductive material such as Al.

An example of the image display apparatus according to the present invention is described in detail below with reference to FIG. 1.

The rear plate 20 having an electron source includes the rear side substrate 1, the x-direction wiring 9 (signal line) to which an electric potential applied according to video signals, an insulating film (which is not shown) over the x-direction wiring 9 and the y-direction wiring 11 (scanning line) provided to intersect with the x-direction wiring 9 and subjected to an electric potential according to a scanning signal. The electron-emitting device 23 connected to the x-direction wirings 9 and the y-direction wirings 11 of scanning lines is formed at the intersection of the y-direction wiring 11 (scanning line) and the x-direction wirings 9. Terminals D0$x$1, D0$x$2, . . . , D0$x$($m$−1) and D0$xm$ are connected to the driving circuit 25 to apply a voltage to the x-direction wirings 9. Terminals D0$y$1, D0$y$2, . . . , D0$y$($m$−1) and D0$ym$ are connected to the driving circuit 25 to apply a voltage to the y-direction wirings 11.

The face plate 21 and the rear plate 20 arranged to oppose each other and sealed with the side wall 24. The sealed internal space is reduced in pressure to about 10 Pa to 5 Pa (hereinafter, referred to as "vacuum state").

A method of driving the image display apparatus according to the present invention is described hereinunder.

In the image display apparatus illustrated in FIG. 1, the driving circuit 25 has a control circuit for controlling an electric potential applied to the x- and the y-direction wiring 9 and 11 and another control circuit for controlling an electric potential applying accelerating voltage to the metallic film 19. The driving circuit 25 supplies an electric potential to the metallic film 19 through a high voltage terminal Hv.

The image display apparatus illustrated in FIG. 1 is typically driven by a simple matrix driving system (a line scan mode).

A selection time rate per one scanning line each time the entire screen is scanned once is defined as "selection time duty." A time rate at which an electron beam is applied to one pixel each time the entire screen is scanned once is defined as "irradiation time duty."

For example, if an image display apparatus with 240 scanning lines is driven by the simple matrix driving system, a selection time duty per scanning line each time the entire screen is scanned once is 1/240 (≈0.21%). For example, if a refresh frequency is taken to be 60 Hz, the maximum selection time is approximately 69.4 μsec.

On the other hand, a time during which an electron beam is actually applied is shorter than a time during which scanning lines are selected because of delay in the driving circuit 25 and due to a wiring capacitance. As a result, an irradiation time duty becomes smaller than 1/240.

Driving the image display apparatus at a high irradiation time duty causes temperature in the phosphor surface to rise to degrade the light emission characteristic of the phosphor, not to cause the phosphor to deliver original performance, resultantly a satisfactory luminance characteristic may not be obtained. The degradation of the phosphor becomes another problem. The increase of the amount of electric charge applied to the phosphor accelerates the degradation of the phosphor and the application of electric charges at a high duty may further accelerate degradation by the influence of rise in temperature of the phosphor surface.

The irradiation time duty is desirably 1/240 or less under such a condition that the maximum electric charge density provided for one pixel is $3 \times 10^{-8}$ C/cm$^2$ or more during one scanning period, like the present invention.

When the simple matrix driving system is used and the number of scanning lines P is 1080 as one example of a driving condition, if a refresh frequency F is 60 Hz, the maximum value of a time T during which signals can be applied to one scanning line during one scanning period is 1/(F·P), or about 15 μsec.

If the density of current Je applied to each pixel is 2 mA/cm$^2$, the density of electric charge Q [C/cm$^2$] provided per unit area is represented by Je×T, or $3 \times 10^{-8}$ C/cm$^2$ in the above example.

The maximum current density [A/cm$^2$] provided for to one pixel is obtained from the current value observed in the face plate 21 and an area irradiated with electron beams for the case where a driving voltage for displaying at a peak luminance is applied to one electron-emitting device. For example, if an electron current value output from one electron-emitting device is 1 μA and an area irradiated with electron beams is $2 \times 10^{-4}$ cm$^2$, a current density is 5 mA/cm$^2$.

As can be seen from the above relationship, the maximum value of the time T during which signals can be applied to one scanning line is limited by the number of scanning lines P and the frequency F, so that, if the number of scanning lines is 768, for example, the time T can be extended.

In practice, the maximum time T is determined in consideration of delay caused by a wiring capacitance and a driving device. If the number of scanning lines P is 1080, the maximum time T may be shorter than 15 μs.

Methods of gradating an image display include those of varying the foregoing time T, the current density J and the combination of the time T and the current density J.

A member referred to as spacer may be interposed between face plate 21 and rear plate 20 to keep constant the distance therebetween according to a screen size.

As described above, the image display apparatus of the present invention is capable of increasing luminance, extending lifetime and widening a color reproducible region.

Although the x- and the y-direction wiring 9 and 11 of the rear plate 20 are used as a signal line and a scanning line respectively in the image display apparatus described above in FIG. 1, the x- and the y-direction wiring 9 and 11 may be used as a scanning line and a signal line respectively.

EMBODIMENTS

The present invention is described in detail below with reference to specific embodiments.

First Embodiment

The phosphor SrGa$_2$S$_4$:Eu was evaluated using the surface conduction electron-emitting device hereinunder.

In the following embodiments, the image display apparatus with 1920 signal lines and 1080 scanning lines for a 55-inch HD TV was used for the evaluation. The picture element measures 635 μm by 635 μm. A tricolor pixel is formed in one picture element. Each pixel measures 635 μm by 212 μm. A light emitting area of the phosphor in a pixel, or so-called numerical aperture was taken to be 30%. A substantial light emitting area in the pixel is about $4 \times 10^{-4}$ cm$^2$.

In the first to the fourth embodiments, the same phosphor was applied to all pixels.

A black matrix was coated in stripes on the face plate with a phosphor application area (a numerical aperture of 30%) left on the glass substrate. Subsequently, phosphor particles turned into a paste by organic binder were coated by the screen printing, arranged on the aperture portions of the black matrix and dried.

In the next place, a filming process was conducted. Acrylic resin was coated to smooth the phosphor surface and then a 100-nm thick Al was deposited as a metal back. After the metal back had been formed, the metal back was baked at a temperature of 450° C. in the atmosphere to remove acrylic resin.

Next, a rear plate with electron-emitting devices was produced.

Matrix wirings were formed on the glass substrate by the screen printing. The surface conduction electron-emitting devices were formed at the intersections of the wirings. The number of signal lines is 1920 and the number of scanning lines is 1080.

The surface conduction electron-emitter was formed in such a manner that an device electrode and conductive thin film were formed, a slit area which becomes an electron-emitting portion by electric conduction was formed and then an activation process was performed.

The face plate and the rear plate thus produced are disposed opposite to each other and a DC voltage of 10 kV is applied to a high voltage terminal HV electrically connected to the metal back. In this state, a pulse voltage is applied to the matrix wiring of the rear plate to emit electrons. Voltages applied to the scanning and the signal lines were set so that a pulse voltage of 18 V was applied across the device electrodes. The refresh frequency is 60 Hz and the simple matrix driving method was used. In this state, a current applied to one pixel is 4 µA, providing a current density of 10 mA/cm$^2$. Luminance was varied by a pulse width gradation method in which the pulse width of an input signal is varied. Light emission luminance and chromaticity coordinates were evaluated as a light emission characteristic using a spectral radiance meter.

Table 1 lists measurements of luminance relative to the luminance at a DC voltage of 10 kV applied to the high voltage terminal of the face plate and an electric charge density of 3×10$^{-8}$ C/cm$^2$ provided to the phosphor ZnS:Cu,Al, where the luminance at this point is taken to be 100.

TABLE 1

Relative comparison of light emission luminance

| | Electric charge density provided | | |
|---|---|---|---|
| | 1 × 10$^{-8}$ C/cm$^2$ | 3 × 10$^{-8}$ C/cm$^2$ | 5 × 10$^{-8}$ C/cm$^2$ |
| SrGa2S4:Eu | 34 | 103 | 171 |
| ZnS:Cu,Al | 44 | 100 | 142 |

Applying an electric charge density of 3×10$^{-8}$ C/cm$^2$ or more to the phosphor SrGa$_2$S$_4$:Eu during one scanning period has realized a higher luminance than to a conventional phosphor ZnS:Cu,Al. The luminance could be represented from low to high luminance with respect to the same electric charge density, realizing an excellent gradation.

Green is (0.21, 0.71) in CIE(x,y) chromaticity coordinates of NTSC RGB, the light emission color of the phosphor ZnS:Cu,Al is (0.26, 0.61) in CIE (x,y) chromaticity coordinates. On the other hand, the light emission color of the phosphor SrGa$_2$S$_4$:Eu of (0.26, 0.68) was obtained in CIE (x,y) chromaticity coordinates, being close to the green CIE (x,y) chromaticity coordinates of NTSC RGB, which has provided a green light emission capable of representing a wider color reproducible region.

Durability was evaluated based on a rate at which luminance lowers after 30000 hours had passed from an initial state. As a result, the conventional phosphor ZnS:Cu,Al was 8% in a lowering rate from the initial luminance, on the other hand, the phosphor SrGa$_2$S$_4$:Eu was 1.5% in a lowering rate from the initial luminance, whose lifetime is longer than the conventional phosphor ZnS:Cu,Al.

Second Embodiment

The phosphor CaMgSi$_2$O$_6$:Eu was evaluated using the image display apparatus with the same surface conduction electron-emitter as in the first embodiment.

Table 2 lists measurements of luminance relative to the luminance at a DC voltage of 10 kV applied to the high voltage terminal of the face plate and an electric charge density of 3×10$^{-8}$ C/cm$^2$ provided to the phosphor ZnS:Ag,Cl, where the luminance at this point is taken to be 100.

TABLE 2

Relative comparison of light emission characteristic

| | Electric charge density provided | | |
|---|---|---|---|
| | 1 × 10$^{-8}$ C/cm$^2$ | 3 × 10$^{-8}$ C/cm$^2$ | 5 × 10$^{-8}$ C/cm$^2$ |
| CaMgSi2O6:Eu | 33 | 102 | 170 |
| ZnS:Ag,Cl | 45 | 100 | 146 |

Applying an electric charge density of 3×10$^{-8}$ C/cm$^2$ or more to the phosphor CaMgSi$_2$O$_6$:Eu during one scanning period has realized a higher luminance than to a conventional phosphor ZnS:Ag,Cl. The luminance could be represented from low to high luminance with respect to the same electric charge density, realizing an excellent gradation.

Blue is (0.140, 0.080) in CIE(x,y) chromaticity coordinates of NTSC RGB, the phosphor ZnS:Ag,Cl was (0.15, 0.05) in CIE (x,y) chromaticity coordinates. On the other hand, the light emission color of the phosphor CaMgSi$_2$O$_6$:Eu of (0.15, 0.04) was obtained in CIE (x,y) chromaticity coordinates, being close to the blue CIE (x,y) chromaticity coordinates of NTSC RGB, which has provided a blue light emission capable of representing a wider color reproducible region.

Durability was evaluated in the same manner as in the first embodiment. As a result, the conventional phosphor ZnS:Ag, Cl was 9% in a lowering rate from the initial luminance, on the other hand, the phosphor CaMgSi$_2$O$_6$:Eu was 2% in a lowering rate from the initial luminance, whose lifetime is longer than the conventional phosphor ZnS:Ag,Cl.

Third Embodiment

The green phosphors Sr$_{0.9}$Ba$_{0.1}$Ga$_2$S$_4$:Eu, Sr$_{0.8}$Ba$_{0.2}$Ga$_2$S$_4$:Eu and Sr$_{0.7}$Ba$_{0.2}$Ga$_2$S$_4$:Eu were evaluated using the image display apparatus with the same surface conduction electron-emitter as in the first embodiment.

The Eu concentration of the phosphors is taken to be Eu/(Sr+Ba)=0.03. The phosphors whose average grain size is adjusted to 3 µm were used. A DC voltage of 10 kV was applied to the high voltage terminal Hv of the face plate. Luminance was measured at a refresh frequency of 60 Hz.

Table 3 lists measurements of luminance relative to the luminance at a DC voltage of 10 kV applied to the high voltage terminal of the face plate and an electric charge density of 3×10$^{-8}$ C/cm$^2$ provided to the phosphor ZnS:Cu,Al, where the luminance at this point is taken to be 100.

TABLE 3

Relative comparison of light emission characteristic

| | Electric charge density provided | | |
|---|---|---|---|
| | $1 \times 10^{-8}$ C/cm$^2$ | $3 \times 10^{-8}$ C/cm$^2$ | $5 \times 10^{-8}$ C/cm$^2$ |
| $Sr_{0.9}Ba_{0.1}Ga_2S_4$:Eu | 35 | 105 | 178 |
| $Sr_{0.8}Ba_{0.2}Ga_2S_4$:Eu | 34 | 102 | 170 |
| $Sr_{0.7}Ba_{0.3}Ga_2S_4$:Eu | 32 | 101 | 168 |
| ZnS:Cu,Al | 42 | 100 | 145 |

Applying an electric charge density of $3 \times 10^{-8}$ C/cm$^2$ or more to the phosphors $Sr_{0.9}Ba_{0.1}Ga_2S_4$:Eu, $Sr_{0.8}Ba_{0.2}Ga_2S_4$:Eu and $Sr_{0.7}Ba_{0.2}Ga_2S_4$:Eu during one scanning period has realized a higher luminance than to a conventional phosphor ZnS:Cu,Al.

The light emission color of the phosphors of (0.22, 0.66) was obtained in CIE(x,y) chromaticity coordinates, which has provided a light emission color close to the green CIE (x,y) chromaticity coordinates of NTSC.

In addition, the same evaluation was performed using the phosphor $Sr_{0.8}Ba_{0.2}Ga_2S_4$:Eu. As a result, the light emission color of the phosphor $Sr_{0.8}Ba_{0.2}Ga_2S_4$:Eu of (0.20, 0.64) was obtained in CIE(x,y) chromaticity coordinates, which has realized a wider color reproducible region.

Furthermore, the same evaluation was performed using the phosphor $Sr_{0.7}Ba_{0.3}Ga_2S_4$:Eu. As a result, the light emission color of the phosphor $Sr_{0.7}Ba_{0.3}Ga_2S_4$:Eu of (0.17, 0.62) was obtained in CIE(x,y) chromaticity coordinates, which has realized a wider color reproducible region.

Fourth Embodiment

A three primary color image display apparatus was produced using $SrGa_2S_4$:EU, $CaMgSi_2O_6$:Eu and $Y_2O_2S$:Eu as green, blue and red phosphor respectively.

The specifications of the image display apparatus are the same as those in the first embodiment.

The light emission characteristic of the phosphor was evaluated while the electron-emitting device was being driven with the high voltage terminal of the face plate subjected to a DC voltage of 10 kV and. Luminance in white was measured by the spectral radiance meter with a white color temperature of 9300 Kelvin as a standard.

Table 4 lists measurements of luminance relative to the luminance at an electric charge density of $3 \times 10^{-8}$ C/cm$^2$ provided to the conventional phosphor P22, where the luminance at this point is taken to be 100.

TABLE 4

Relative comparison of light emission characteristic

| | Electric charge density provided | | |
|---|---|---|---|
| | $1 \times 10^{-8}$ C/cm$^2$ | $3 \times 10^{-8}$ C/cm$^2$ | $5 \times 10^{-8}$ C/cm$^2$ |
| Phosphor of present embodiment | 40 | 110 | 178 |
| Conventional phosphor P22 | 47 | 100 | 139 |

Applying an electric charge density of $3 \times 10^{-8}$ C/cm$^2$ or more during one scanning period to the phosphors of the present embodiment has realized a higher luminance than to the conventional phosphor P22.

The color reproducible region where the light emission color of green, blue and red phosphors in CIE(x,y) chromaticity coordinates can be represented was calculated. It was found that the color reproducible region provided by the phosphors of the present embodiment increased 1.4 times as much as that by the combination of the conventional tricolor phosphors P22.

The lifetime of the phosphors of the present invention is five times as long as that of the conventional phosphor P22, which has provided a more durable image display apparatus than an image display apparatus using the conventional phosphor P22.

The light emission efficiency of the image display apparatus was measured using the Spindt electron-emitting device as an electron-emitting device of the rear plate. As a result, it was found that the light emission efficiency obtained was the same as that in the present embodiment using the surface-conduction electron-emitting device.

Fifth Embodiment

A three primary color image display apparatus which is the same as that in the fourth embodiment was produced using $SrGa_2S_4$:Eu, $CaMgSi_2O_6$:Eu and $CaAlSiN_3$:Eu as green, blue and red phosphor respectively.

The face plate and the rear plate thus produced are disposed opposite to each other, the electron-emitting device is driven with the high voltage terminal Hv of the face plate subjected to a DC voltage of 10 kV and then the light emission characteristic of the phosphor was evaluated. The light emission efficiencies of the phosphors were compared with each other with a white color temperature of 9300 Kelvin as a standard.

Table 5 lists measurements of luminance relative to the luminance at an electric charge density of $3 \times 10^{-8}$ C/cm$^2$ provided to the conventional phosphor P22 as is the case with the fourth embodiment, where the luminance at this point is taken to be 100.

TABLE 5

Relative comparison of light emission characteristic

| | Electric charge density provided | | |
|---|---|---|---|
| | $1 \times 10^{-8}$ C/cm$^2$ | $3 \times 10^{-8}$ C/cm$^2$ | $5 \times 10^{-8}$ C/cm$^2$ |
| Phosphor of present embodiment | 34 | 103 | 172 |
| Conventional phosphor P22 | 47 | 100 | 139 |

Applying an electric charge density of $3 \times 10^{-8}$ C/cm$^2$ or more during one scanning period to the phosphors of the present embodiment has realized a higher luminance than to the conventional phosphor P22.

The color reproducible region provided by the phosphors of the present embodiment increased 1.5 times as much as that by the combination of the conventional tricolor phosphors P22.

The phosphors of the present embodiment have realized excellent moving image characteristics and durability.

Sixth Embodiment

The green and blue phosphors $SrGa_2S_4$:Eu and $Sr_2P_2O_7$:Eu were evaluated. The Eu concentration in the phosphor $Sr_2P_2O_7$:Eu is taken to be 0.015 with respect to Sr. That of Eu concentration in the phosphor $SrGa_2S_4$:Eu is taken to be 0.05.

A DC voltage of 10 kV was applied to the high voltage terminal Hv of the face plate with these phosphors. Electron beams with an electric charge density of $1\times10^{-8}$ C/cm$^2$ to $5\times10^{-8}$ C/cm$^2$ were applied to the phosphors. As a result, the application of electron beams with an electric charge density of at least $3\times10^{-8}$ C/cm$^2$ or more to one pixel during one scanning period has provided a light emission characteristic superior to that of the conventional phosphor.

Seventh Embodiment

A face plate was produced using a phosphor $Sr_3MgSi_2O_8$:Eu as a blue phosphor. The Eu concentration in the phosphor $Sr_3MgSi_2O_8$:Eu was taken to be 0.03 with respect to Sr.

A DC voltage of 10 kV was applied to the high voltage terminal Hv of the face plate with the phosphor. Electron beams with an electric charge density of $1\times10^{-8}$ C/cm$^2$ to $5\times10^{-8}$ C/cm$^2$ were applied to the phosphor. As a result, the application of electron beams with an electric charge density of at least $3\times10^{-8}$ C/cm$^2$ or more to one pixel during one scanning period has provided a light emission characteristic superior to that of the conventional phosphor.

Eighth Embodiment

A comparison was made for the cases where the numerical aperture was and was not adjusted using the image display apparatus which is similar in structure to that in the first embodiment.

Each pixel measures 635 μm by 212 μm. A numerical aperture is 30% where the light emission region of the phosphor is not adjusted.

Used were $SrGa_2S_4$:Eu, $CaMgSi_2O_6$:Eu and $Y_2O_2S$:Eu as green, blue and red phosphor respectively. The CIE(x,y) chromaticity coordinates of the green, blue and red phosphors are (0.264, 0.686), (0.149, 0.042) and (0.656, 0.337).

In the light emission efficiency of the combination of these phosphors, green is greater than red which is greater than blue. When a white balance is set to a color temperature of 9300 Kelvin, the light emission efficiency of the blue phosphor limits luminance.

For this reason, an aperture area was varied by decreasing the numerical aperture of the green phosphor having a margin in luminance and increasing that of the blue phosphor with the white balance maintained.

The pattern of the aperture is illustrated in FIG. 5. The luminance had a peak when the aperture of the blue phosphor was increased by 30% and that of the green phosphor was decreased by 30%. The luminance was improved by 30% compared with that where the numerical aperture is not adjusted, which enabled the white balance to be maintained.

Ninth Embodiment

The image display apparatus which is similar in structure to that in the eighth embodiment was used. The surface-conduction electron-emitters illustrated in FIGS. 3A and 3B are arranged in the row (x) and the column (y) direction. The red, green and blue phosphors were sequentially arranged in this order in the row direction. The beam profile of the surface-conduction electron-emitter is the same as that illustrated in FIG. 7. The minor direction of the beam coincides with the row direction and the major direction coincides with the column direction.

As is the case with the eighth embodiment, $SrGa_2S_4$:EU, $CaMgSi_2O_6$:Eu and $Y_2O_2S$:Eu were used in combination as green, blue and red phosphor respectively. Aperture area was set with a white balance of 9300 Kelvin maintained.

The image display apparatus thus produced showed the predetermined luminance and white balance. The face plate and the rear plate could be located with sufficient accuracy.

Tenth Embodiment

An electron beam excitable image display apparatus was produced similarly to the first embodiment. Phosphors $SrGa_2S_4$:EU, $CaMgSi_2O_6$:Eu and $Y_2O_2S$:Eu were used as green, blue and red phosphor respectively. The luminescence center concentration in which the phosphors $SrGa_2S_4$:EU and $CaMgSi_2O_6$:Eu reach the highest luminance is approximately 4.5 at % and 3.5 at % respectively. Luminance required to display white at 9300 Kelvin where these phosphors are combined is a little insufficient in blue. For this reason, the phosphors have been used whose maximum luminance is suppressed by taking the Eu concentration of $CaMgSi_2O_6$:Eu and $SrGa_2S_4$:EU to be 3.5 at % and 1 at % respectively to display a desired white at the same electric charge density provided. As a result, the image display apparatus could be obtained capable of displaying white at 9300 Kelvin at the same electric charge density provided.

Eleventh Embodiment

An electron beam excitable image display apparatus was produced similarly to the first embodiment, whose resolution corresponds to a quarter video graphics array (QVGA) and which has 320 signal lines and 180 scanning lines.

The green phosphor $SrGa_2S_4$:EU was used in the phosphor screen.

The apparatus was progressive-driven at an accelerating voltage of 10 kV, in a current density of 1 mA/cm$^2$ per one pixel and at a refresh frequency of 60 Hz. Time was evaluated during which luminance is halved where the apparatus is driven at three application time duties of 1/360 (electron beam application time per one pixel every scanning of about 46 μsec), 1/240 (about 69 μsec) and 1/180 (about 92 μsec).

If time during which luminance is halved where the apparatus is driven at an irradiation time duty of 1/360 is taken to be 100, the values relative to those at application time duties of 1/240 and 1/180 were 66.7 and 43 respectively.

A lifetime characteristic fitting theory of Coulomb Degradation in which luminance decreases with increase in quantity of electric charges applied to phosphors could be obtained at application time duties of 1/360 and 1/240. On the other hand, at an irradiation time duty of 1/180, luminance is less than a relative value of 50 which is a theoretical characteristic of Coulomb Degradation and further degraded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-140880, filed on May 19, 2006, and 2007-102687, filed on Apr. 10, 2007, which are hereby incorporated by reference herein in their entirety.

What is claimed is:

1. An image display apparatus comprising:
   a rear plate provided with a plurality of electron-emitting devices, each of electron-emitting devices emitting electrons;
   a face plate disposed opposite the plurality of electron-emitting devices and provided with a plurality of pixels of phosphor, each pixel of phosphor being irradiated with electrons emitted from a corresponding one of the electron-emitting devices to generate light;

a driver to scan the plurality of electron-emitting devices to drive the plurality of electron-emitting devices for emitting electrons, wherein the phosphor contains as a combination of a host material and a luminescence center $SrGa_2S_4$:Eu or $Sr_{(1-x)}Ba_xGa_2S_4$:Eu, wherein, when the phosphor contains $SrGa_2S_4$:Eu, a luminescence center concentration expressed as a ratio Eu/Sr, satisfies $0.001 \leq Eu/Sr \leq 0.1$ such that a maximum electric charge density provided for one pixel of phosphor during one scanning period is $3 \times 10^{-8}$ C/cm$^2$ or more under a predetermined density of current applied to the pixel of phosphor, and wherein, when the phosphor contains $Sr_{(1-x)}Ba_xGa_2S_4$:Eu, $0 \leq x \leq 0.3$ is satisfied, and a luminescence center concentration expressed as a ratio Eu/(Sr+Ba), satisfies $0.001 \leq Eu/(Sr+Ba) \leq 0.1$ such that a maximum electric charge density provided for one pixel of phosphor during one scanning period is $3 \times 10^{-8}$ C/cm$^2$ or more under a predetermined density of current applied to the pixel of phosphor.

2. The image display apparatus according to claim 1, wherein the electron-emitting devices are surface conduction electron-emitting devices.

3. A method of driving image display apparatus which comprises a rear plate provided with a plurality of electron-emitting devices, each of the electron-emitting devices emitting electrons, and a face plate disposed opposite the plurality of electron-emitting devices and provided with a plurality of pixels of phosphor, each pixel of phosphor being irradiated with electron emitted from a corresponding one of the electron-emitting devices to generate light wherein the phosphor contains, as a host material, thiogallate and luminescence center of allowed transition type material, the method comprising step of:

scanning the plurality of electron-emitting devices to drive the plurality of electron-emitting devices for emitting electrons, wherein the phosphor contains, as a combination of a host material and a luminescence center $SrGa_2S_4$:Eu or $Sr_{(1-x)}Ba_xGa_2S_4$:Eu, wherein, when the phosphor contains $SrGa_2S_4$:Eu, the luminescence center concentration expressed as the ratio Eu/Sr, satisfies $0.001 \leq Eu/Sr \leq 0.1$ such that a maximum electric charge density provided for one pixel of phosphor during one scanning period is $3 \times 10^{-8}$ C/cm$^2$ or more under a predetermined density of current applied to the pixel of phosphor, and wherein, when the phosphor contains $Sr_{(1-x)}Ba_xGa_2S_4$:Eu, $0 \leq x \leq 0.3$ is satisfied, and a luminescence center concentration expressed as a ratio Eu/(Sr+Ba), satisfies $0.001 \leq Eu/(Sr+Ba) \leq 0.1$ such that a maximum electric charge density provided for one pixel of phosphor during one scanning period is $3 \times 10^{-8}$ C/cm$^2$ or more under a predetermined density of current applied to the pixel of phosphor.

4. The method according to claim 3, wherein the plurality of electron-emitting devices is driven by a pulse-width modulation method.

5. An image display apparatus comprising:

a rear plate provided with a plurality of electron-emitting devices, each of electron-emitting devices emitting electrons;

a face plate disposed opposite the plurality of electron-emitting devices and provided with a plurality of pixels of phosphor, each pixel of phosphor being irradiated with electrons emitted from a corresponding one of the electron-emitting devices to generate light;

a driver to scan the plurality of electron-emitting devices to drive the plurality of electron-emitting devices for emitting electrons, wherein the phosphor contains, as a combination of a host material and a luminescence center $CaMgSi_2O_6$:Eu, and wherein a luminescence center concentration expressed as a ratio Eu/Ca, satisfies $0.01 \leq Eu/Ca \leq 0.07$ such that a maximum electric charge density provided for one pixel of phosphor during one scanning period is $3 \times 10^{-8}$ C/cm$^2$ or more under a predetermined density of current applied to the pixel of phosphor.

6. A method of driving an image display apparatus which comprises:

a rear plate provided with a plurality of electron-emitting devices, each of electron-emitting devices emitting electrons; and a face plate disposed opposite the plurality of electron-emitting devices and provided with a plurality of pixels of phosphor, each pixel of phosphor being irradiated with electrons emitted from a corresponding one of the electron-emitting devices to generate light, the method comprising a step of:

scanning the plurality of electron-emitting devices to drive the plurality of electron-emitting devices for emitting electrons, wherein the phosphor contains, as a combination of a host material and a luminescence center $CaMgSi_2O_6$:Eu, and wherein the luminescence center concentration expressed as the ratio Eu/Ca, satisfies $0.01 \leq Eu/Ca \leq 0.07$ such that a maximum electric charge density provided for one pixel of phosphor during one scanning period is $3 \times 10^{-8}$ C/cm$^2$ or more under a predetermined density of current applied to the pixel of phosphor.

* * * * *